United States Patent
Roy et al.

(10) Patent No.: US 9,303,150 B2
(45) Date of Patent: Apr. 5, 2016

(54) REINFORCED AND CROSSLINKED POLYARYLENES, METHODS OF MANUFACTURE, AND USES THEREOF

(71) Applicants: Sayantan Roy, Houston, TX (US); Bennett M. Richard, Kingwood, TX (US); Jeffrey R. Potts, Bellaire, TX (US); Anil K. Sadana, Houston, TX (US)

(72) Inventors: Sayantan Roy, Houston, TX (US); Bennett M. Richard, Kingwood, TX (US); Jeffrey R. Potts, Bellaire, TX (US); Anil K. Sadana, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 47 days.

(21) Appl. No.: 14/244,184

(22) Filed: Apr. 3, 2014

(65) Prior Publication Data
US 2015/0284542 A1 Oct. 8, 2015

(51) Int. Cl.
C08K 7/26 (2006.01)
C08K 7/00 (2006.01)

(52) U.S. Cl.
CPC ............... *C08K 7/26* (2013.01); *Y10T 428/215* (2015.01)

(58) Field of Classification Search
CPC .......................................................... C08K 7/26
USPC .......... 524/493; 525/330.9, 331.8; 528/502 F, 528/503; 428/63, 66.4
See application file for complete search history.

(56) References Cited

U.S. PATENT DOCUMENTS

| | | |
|---|---|---|
| 5,622,684 A | 4/1997 | Pinnavaia et al. |
| 5,672,556 A | 9/1997 | Pinnavaia et al. |
| 5,785,946 A | 7/1998 | Pinnavaia et al. |
| 5,795,559 A | 8/1998 | Pinnavaia et al. |
| 5,800,800 A | 9/1998 | Pinnavaia et al. |
| 6,506,485 B1 | 1/2003 | Pinnavaia et al. |
| 6,528,034 B1 | 3/2003 | Pinnavaia et al. |
| 6,641,659 B1 | 11/2003 | Obregon Pena et al. |
| 6,946,109 B2 | 9/2005 | Pinnavaia et al. |
| 7,132,165 B2 | 11/2006 | Pinnavaia et al. |
| 2006/0182942 A1 | 8/2006 | Valle et al. |
| 2010/0029832 A1 | 2/2010 | Pinnavaia et al. |
| 2011/0018425 A1 | 1/2011 | De Cremer et al. |
| 2011/0281993 A1 | 11/2011 | Pinnavaia et al. |
| 2013/0079427 A1 | 3/2013 | Duan et al. |

(Continued)

FOREIGN PATENT DOCUMENTS

WO 2008085939 A2 7/2008

OTHER PUBLICATIONS

Baker Hudges Incorporated; Composition for production of . . . disposed metal; US Patent Appl.Publ; Jan. 2014, Chem Abstract 160:175701.*

(Continued)

*Primary Examiner* — Duc Truong
(74) *Attorney, Agent, or Firm* — Cantor Colburn LLP

(57) ABSTRACT

A composition contains a polymer component comprising a crosslinked product of a polyarylene, a crosslinked product of a substituted polyphenylene, a crosslinked product of a polyphenylene sulfide and a polyphenylsulfone, or a combination comprising at least one of the foregoing; and a mesoporous silicate having an average pore size of about 5 nanometers to about 50 nanometers. The composition has high-temperature elastomeric properties and excellent mechanical strength. The compositions are useful in oil and gas downhole applications. Methods for the manufacture of the composition and articles comprising the composition are also disclosed.

37 Claims, 4 Drawing Sheets

(56) References Cited

U.S. PATENT DOCUMENTS

2013/0079432 A1     3/2013    Duan et al.
2013/0131210 A1     5/2013    Gerrard et al.
2013/0280151 A1    10/2013    Lee et al.

OTHER PUBLICATIONS

Barrett et al., "The Determination of Pore Volume and Area Distributions in Porous Substances", The Volume and Area Distributions in Porous Substances, vol. 73, Jan. 1951, pp. 373-380.

Horvath et al., "Method for the Calculation of Effective Pore Size Distribution in Molecular Sieve Carbon", Journal of Chemical Engineering of Japan, vol. 16, No. 6, 1983, pp. 470-475.

International Search Report and Written Opinion; International Application No. PCT/US2015/017278; International Filing Date: Feb. 24, 2015; Date of Mailing: Apr. 29, 2015; 14 pages.

Lukens et al., "Evaluating Pore Sizes in Mesoporous Materials: A Simplified Standard Adsorption Method and a Simplified Broekhoff-de Boer Method", Langmuir 1999, 15, pp. 5403-5409.

* cited by examiner

REINFORCED AND CROSSLINKED POLYARYLENES, METHODS OF MANUFACTURE, AND USES THEREOF

BACKGROUND

Elastomers are used in applications as diverse as packer elements, blow out preventer elements, O-rings, gaskets, and the like. In downhole drilling and completion (for example gas and oilfield exploration and production, carbon dioxide sequestration, etc.) the elastomers are often exposed to high temperatures and harsh chemical and mechanical subterranean environments that can degrade elastomer performance over time, reducing their reliability. Thus, in the oil and gas industry, it is important for an elastomer to have good chemical resistance at high temperature. It is also desirable for the elastomer to have optimal mechanical strength so that it does not extrude during application and, when in use, an article made from the elastomer can hold differential hydraulic pressure while applied downhole.

Additives can be used to adjust the properties of the elastomers. One difficulty in developing suitable elastomeric materials for downhole applications is that use of one additive to improve one property can concomitantly degrade another desired property. For example, adding fillers to an elastomer can improve the mechanical strength of the elastomer. However, in order to achieve any meaningful improvement, fillers such as carbon black and nonporous silica have to be used in a significant amount; and at a high loading level, fillers can have detrimental effects on the elastomeric properties of the elastomer. To reduce the loading level of the filler, a binder may be used to bond the filler to the elastomer. However, this approach is more suitable for low temperature applications because at high temperatures, the bond between the filler and the elastomer provided by the binder tends to dissociate thus compromising the mechanical strength of the elastomeric material. In addition, binders tend to function as a plasticizer, which may lead to the deterioration of tensile properties of the elastomer.

Therefore, there remains a need in the art for elastomeric materials that provide a delicate balance of mechanical strength, elasticity, and chemical resistance at high temperatures. It would be a further advantage if the balance of the properties can be achieved at relatively low filler loading levels without using any binders.

BRIEF DESCRIPTION

Disclosed herein is a composition that comprises:
a polymer component comprising a crosslinked product of a polyarylene of formula (1)

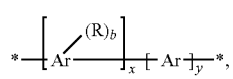

a crosslinked product of a polyphenylene sulfide and a polyphenylsulfone, or a combination comprising at least one of the foregoing crosslinked product; and
a mesoporous silicate having an average pore size of about 5 nanometers to about 50 nanometers;
wherein in formula (1) each Ar is the same or different, and is independently a C6-C32 aromatic group having only carbon atoms in the ring, R is a substituent on the aromatic group wherein each R is the same or different, and each R is independently a C1-C20 hydrocarbyl group, C1-C20 hydrocarbyloxy group, C1-C20 hydrocarbylthio group, trialkylsilyl group, halogen, nitro group, cyano group, hydroxyl group, mercapto group, hydrocarbyl carbonyl group, formyl group, C1-C20 dihydrocarbyl ether group, carboxylic acid group or a salt thereof, carboxylic ester group, primary, secondary or tertiary amino group, primary or secondary aminocarbonyl group, phosphonic acid group or a salt thereof, sulfonic acid group or a salt thereof, polyalkyleneoxy group, or polyphenyleneoxy group, b is an integer from 0-10, provided that the valence of Ar is not exceeded;

x and y are the same or different, and either x or y can be zero, provided that x+y is greater than about 10.

A method for the manufacture of the composition comprising a crosslinked product of the polyarylene of formula (1) and a mesoporous silicate, comprises: mixing the polyarylene of formula (1) with the mesoporous silicate and a crosslinking agent at a temperature and for a time effective to form the composition.

A method for the manufacture of the composition comprising a crosslinked product of a polyphenylene sulfide and a polyphenylsulfone and a mesoporous silicate comprises heating the polyphenylene sulfide, the polyphenylsulfone, and the mesoporous silicate in presence of a crosslinking agent at a temperature and for a time effective to form the composition.

Articles comprising the compositions are also disclosed.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
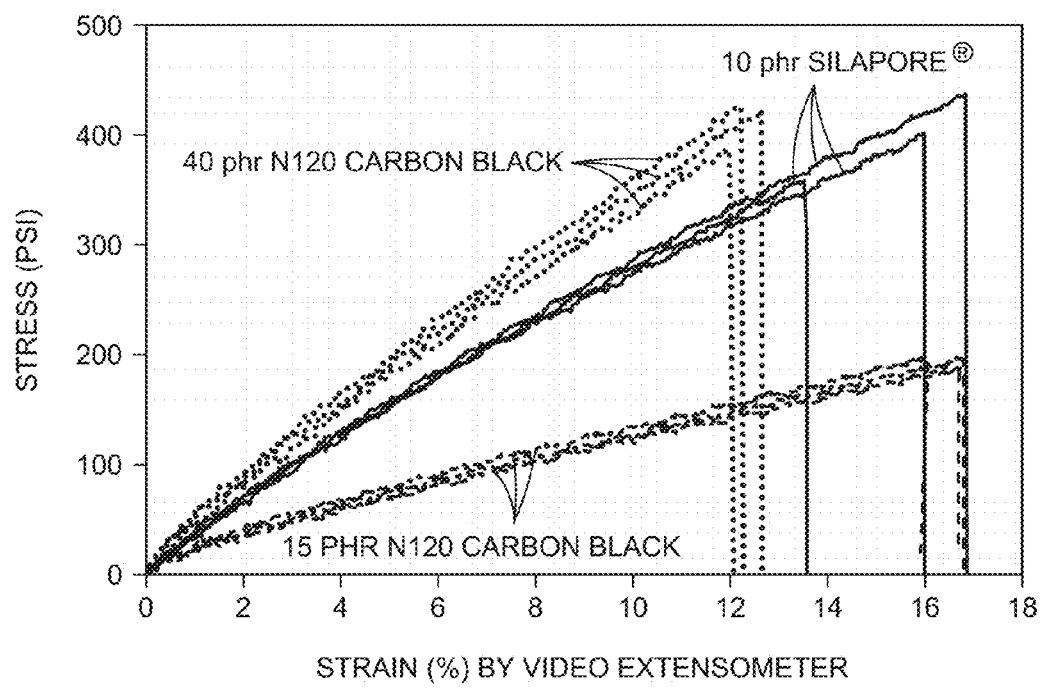
FIG. 1 shows stress-strain curves of compositions containing crosslinked product of polyphenylene sulfide and polyphenylsulfone and 10 phr mesoporous silica, 10 phr carbon black, and 40 phr carbon black respectively.

A detailed description of one or more embodiments of the disclosed composition, apparatus and method are presented herein by way of exemplification and not limitation with reference to the Figures.

Applicants have found that an addition of mesoporous silicate having an average pore size of 5 nanometers to 50 nanometers to a crosslinked product of polyarylene or a crosslinked product of a polyphenylene sulfide and a polyphenylsulfone significantly enhances the mechanical properties of the crosslinked products. Compared with conventional fillers such as carbon black and nonporous silica, a much smaller amount of mesoporous silicate is needed in order to achieve an optimal mechanical strength for the crosslinked product. In a further advantageous feature, the optimal strength can be achieved without using any binders. Without wishing to be bound by theory, it is believed that polyarylene, polyphenylene sulfide and polyphenylsulfone can at least partially penetrate the pores of the mesoporous silicate and provide a physical bonding between the mesoporous silicate and the polymer even after crosslinking.

Applicants also found that mesoporous silicate does not adversely affect the elastic properties of the crosslinked product of polyarylene or the crosslinked product of a polyphenylene sulfide and a polyphenylsulfone at high temperatures. Further, the mesoporous silicate was found to be inert by not interfering with basic polymer properties such as chemical inertness. The compositions containing the crosslinked polymers and the mesoporous silicate were found to have high temperature downhole fluid compatibility at least as good as the corresponding unfilled crosslinked polymers.

With this discovery, it is now possible to manufacture reinforced high temperature elastomer compositions having balanced mechanical strength, elasticity, chemical resistance, and downhole fluid compatibility. Such compositions are useful in downhole and completion applications.

Accordingly, there is provided in an embodiment a composition comprising a polymer component comprising a crosslinked product of a polyarylene, a crosslinked product of a polyphenylene sulfide and a polyphenylsulfone, or a combination comprising at least one of the foregoing crosslinked product; and a mesoporous silicate having an average pore size of about 5 nanometers to about 50 nanometers.

As used herein, silicate refers to a solid compound containing silicon covalently bonded to four oxygen centers to form tetrahedral $SiO_4$ subunits. One or more oxygen atoms of the subunit may bridge to one or more metal centers in the compound. Thus, one or more other elements may be combined with oxygen and silicon to form a silicate. The solid may be atomically ordered (crystalline) or disordered (amorphous). Silica in hydrated form (empirical formula $SiO_2$ x $H_2O$, where x is a number denoting the equivalent water content of the composition) or dehydrated form (empirical formula $SiO_2$) is included in the definition of silicate.

In various embodiments, the mesoporous silicate comprises ordered surfactant-templated mesoporous silicates, disordered surfactant-templated mesoporous silicates, mesoporous layered silicate clays, or a combination comprising at least one of the foregoing. Mesoporous silicates are disclosed in US Patent Application Publication Nos. 2010029832 and 20110281993.

Suitable surfactant-templated mesoporous silicates include mesocellular foam-structured mesoporous silica, wormhole-structured mesoporous silica, and lamellar mesoporous silica, wherein the pore network extends not only parallel to the lamellae but also orthogonal to the lamellae owing to surface-templated pores that permeate the lamellae.

Surfactant templated mesoporous silicates are prepared in the presence of surfactant micelles as mesoporogen templates that direct the assembly of the pore network. The removal of the surfactant porogens through calcination or solvent extraction affords an open mesoporous silicate with controllable mesopores sizes depending on the size of the surfactant micelles used to template the pores.

Surfactant templated silicates are said to be "ordered" or "mesostructured" if the mesopores and the mesopore walls are sufficiently regular to provide for the presence of one or more Bragg reflections in the small angle region of the X-ray powder pattern corresponding to the presence of regularly repeating basal planes greater than 2 nm apart. The presence of one or more low angle Bragg reflections means the pore size and pore walls are sufficiently regular and repeatable over distances effective in providing for Bragg scattering. That is, it is the spacing between pore walls that gives rise to small angle Bragg scattering. The pore walls do not need to be crystalline (atomically ordered) to give rise to small angle Bragg scattering; they simply need to be regular in thickness and regularly separated by pores of uniform size.

If the surfactant templated silicate does not show small angle Bragg diffraction peaks, then the mesoporous silicate is said to be "disordered" or "not mesostructured." This means that the pore size and pore wall thickness is not sufficiently regular and repeatable to give rise to low angle Bragg reflections. "Disordered" mesoporous silicates can arise through variations in the pore sizes (due to variations in the templating surfactant sizes, for example), through variations in the pore wall thickness due to inhomogeneous reaction conditions, or through variations in both pore size and pore wall thickness.

Mesoporous layered silicate clay includes a synthetic crystalline layered silicate clay mineral composition wherein the mesopores are formed through the disordered aggregation of unstacked clay nanolayers approximately 1 nm in thickness.

Other non-limiting examples of mesoporous silicate materials include mesoporous structures assembled from electrically neutral surfactant porogens. Materials having suitable porosity parameters can be prepared according to published procedures. For example, surfactant-templated lamellar silicates are described in U.S. Pat. Nos. 7,132,165; 6,946,109; and 6,528,034. Surfactant templated wormhole silicates are described in U.S. Pat. Nos. 5,800,800; 5,795,559; 5,785,946; 5,672,556; and 5,622,684. In other embodiments, the mesoporous silicate materials comprise mesoporous, mesocellular foam compositions. Suitable mesocellular foam compositions include those described in U.S. Pat. Nos. 6,641,659 and 6,506,485.

The average mesopore size of a mesoporous solid is determined from the pore size distribution obtained from the adsorption branch of the nitrogen adsorption—desorption isotherms using the Horvath—Kawazoe or HK model (Horvath, G.; Kawazoe, K. J. J. Chem. Eng. Jpn. 1983, 16, 470) or the Barrret-Joyner-Halenda or BJH model for the filling of mesopores. [Barrett, E. P.; Joyner, L. G.; Halenda, P. P. J. Am. Chem. Sod 951, 73, 373]. In the case of mesocellular foam silicas, the BJH model as well as the modified Broekhoff-deBoer model (BdB-FHH2) [W. W. Lukens, P. Schmidt-Winkel, D. Y. Zhao, J. L. Feng, G. D. Stucky, Langmuir 1999, 15, 5403] is used to obtain the mesopore size distribution and average mesopore size. In an embodiment, the mesoporous silicate has a surface area of at least 400 meters square per gram, an average mesopore diameter of at least 4 nanometers, and a pore volume of at least 1.0 cubic centimeters per grams, wherein at least 20% of the total pore volume is due to the presence of mesopores 2 to 50 nm in size.

In an embodiment, mesoporous silicates suitable for the composition have an average pore size of 5 nm to 50 nm, specifically 10 to 30, more specifically 20 to 30. The mesoporous silicate is present in an amount of 2 to 30 parts, 5 to 20 parts, or 8 to 15 parts by weight per 100 parts by weight of the polymer component.

Exemplary mesoporous silicates that can be used include those that are available from sources such as Mesoporous Silica Inc, Claytec Inc, American Elements, Taiyo International, and Sigma-Aldrich. Commercial grades of mesoporous silicate include those with the trade names SILAPORE®, SI-OX-01-MESO®, and TMPS®.

In another embodiment, mesoporous silicates can be combined with other conventional fillers, e.g. carbon black, carbon nanotubes, etc. to obtain desired property improvements.

The polymer component can include a crosslinked product of a polyarylene of formula (1)

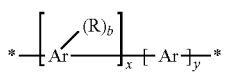
(1)

wherein
each Ar is the same or different, and is independently a C6-C32 aromatic group having only carbon atoms in the ring,
R is a substituent on the aromatic group wherein each R is the same or different, and each R is independently a C1-C20 hydrocarbyl group, C1-C20 hydrocarbyloxy group, C1-C20 hydrocarbylthio group, trialkylsilyl group, halogen, nitro group, cyano group, hydroxyl group, mercapto group, hydrocarbyl carbonyl group (—C(O)C1-C20 hydrocarbyl), formyl group (—C(O)H), C1-C20 dihydrocarbyl ether group (—(C1-C10 hydrocarbyl)-O—(C1-C10 hydrocarbyl)), carboxylic acid group (—C(O)OH) or a salt thereof, carboxylic ester group (—C(O)O(C1-C12 hydrocarbyl)), primary, secondary or tertiary amino group (—NH$_2$, —NH(C1-C12 hydrocarbyl), —N(C1-C12 hydrocarbyl)$_2$, primary or secondary aminocarbonyl group (—C(=O)NH$_2$, —C(O)NH(C1-C12 hydrocarbyl) phosphonic acid group (—P(O)(OH)$_2$) or a salt thereof, sulfonic acid group (—S(O)$_2$(OH)) or a salt thereof, polyalkyleneoxy group (—O(C1-C4)alkyl)$_n$ wherein n is 2-12), or polyphenyleneoxy group (—O(C6-C10 aryl)$_n$ wherein n is 2-12).
b is an integer from 0-10, provided that the valence of Ar is not exceeded; and
x and y the same or different, and either x or y can be zero, provided that x+y is greater than about 10.

Different Ar groups can be present in the polyarylenes, for example a combination of units that contain a phenylene group and units that contain a naphthylene group. In addition, each unit can have a different pattern of substitution on the Ar groups, for example a combination of units that is unsubstituted (n=0) and units that are substituted.

In a specific embodiment the polymer component includes a crosslinked product of polyarylenes of formula (2)

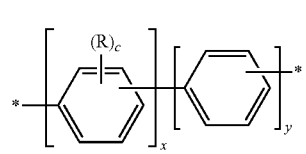
(2)

wherein
each R is the same or different, and is as defined in formula (1),
c is an integer from 0 to 4, and
x and y are as defined in formula (1).

In an embodiment, each R is the same or different, and is a linear or branched C1-C10 alkyl, linear or branched C2-C10 alkenyl, linear or branched C2-C10 alkynyl, C6-C18 aryl, C7-C20 alkylaryl, C7-C20 arylalkyl, C5-C10 cycloalkyl, C5-C20 cycloalkenyl, linear or branched C1-C10 alkylcarbonyl, C6-C18 arylcarbonyl, halogen, nitro, cyano, carboxylic acid or a salt thereof, phosphonic acid or a salt thereof, or sulfonic acid or a salt thereof.

In another embodiment each R is the same or different, and is a linear or branched C1-C6 alkyl, C6-C12 aryl, C7-C13 alkylaryl, C7-C13 arylalkyl, linear or branched C1-C6 alkylcarbonyl, C6-C12 arylcarbonyl, C7-C13 alkylarylenecarbonyl, C7-C13 arylalkylene carbonyl, halogen, nitro, cyano, carboxylic acid or a salt thereof, phosphonic acid or a salt thereof, or sulfonic acid or a salt thereof, and c is an integer from 0 to 4, specifically 0 to 3, or 0 to 2. Alternatively, c can be an integer from 1 to 4, 1 to 3, or 1 to 2, and x is greater than 1, or both x and y are integers greater than 1.

In another embodiment each R is the same or different, and is a linear or branched C1-C6 alkyl, C6-C12 arylcarbonyl, or halogen, and c is an integer from 0 to 4, specifically 0 to 3, or 0 to 2. Alternatively, c can be an integer from 1 to 4, 1 to 3, or 1 to 2, and x is greater than 1 or both x and y are integers greater than 1.

In still another embodiment, each R is C6-C12 arylcarbonyl, e.g., 2-naphthoyl, benzoyl, 2-methylbenzoyl (2-toluoyl), —C(O)-(1,4-phenylene-O-1,4-phenylene-C(O)—)$_x$-phenyl, or 4-phenoxybenzoyl, c is one and x and y are both integers greater than 1. Specifically, R is benzoyl, c is 1, and x and y are both integers greater than 1.

The polyarylenes used for crosslinking can be linked through the para positions as illustrated in formula (2a), the meta positions, the ortho positions, or a combination of para and meta position as illustrated in formula (2b).

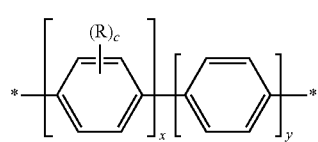
(2a)

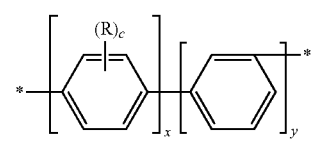
(2b)

The linking of the unsubstituted phenylene units can be at least 90%, at least 95%, or 99% para, with the remaining linkages being ortho or meta. In an embodiment, the polyarylenes are linked at the para positions on the substituted phenylene and a combination of para, ortho, and meta positions on the unsubstituted phenylene as shown in formula (2c).

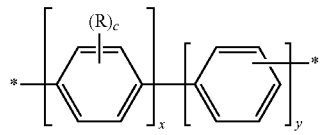

The polyarylenes can have at least 95% para linkages, specifically at least 99% para linkages in the polymer. The substituted and unsubstituted units can be in any linear configuration, e.g., alternating (ABAB), or block (AABB). In an embodiment, the unsubstituted units are present in blocks having 2 or more, 6 or more, 8 or more, or 10 or more units. The ratio of x:y in the polyarylenes can vary from 1:99 to 99:1, for example, although it is possible to have ratios of x:y of 1:1000 to 1:10.

The polyarylenes contain 50% or more, 85% or more, 90% or more, 95% or more, or 99% or more of the units of formula (1) based on the total number of repeat units in the polymers. Other units that can be present include, for example, units of formula (3)

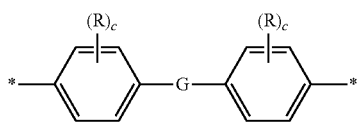

wherein
each R is the same or different and is as defined in formula (1),
c is as defined in formula (2), and
G is —O—, —S—, —CH$_2$—, —OCH$_2$—, —O(C6-C12 aryl), —O(C6-C12 aryl)-O)$_m$—, —(CH$_2$)$_m$—, —C(O)—, —C(O)$_2$—, —O(CH$_2$CH$_2$O)$_m$—, —(CF$_2$)$_m$—, —C(O)(C6-C12 aryl)C(O)—. In an embodiment, the polyarylenes contain only units of formula (1), specifically units of formula (2), and terminal groups.

The polyarylenes can be linear or branched, having 1 or more, 2 or more, or 5 or more branching points per 1,000 carbon atoms along the polymer chain. In an embodiment, the polyarylenes are linear, having 10 or fewer, 5 or fewer, 2 or fewer, or 1 or fewer branching points per 1,000 carbon atoms along the polymer chain.

In an embodiment, the polyarylenes for crosslinking have a glass transition temperature (Tg) of about 100 to about 150° C.

The polyarylenes for crosslinking can further have a weight average molecular weight (Mw) of about 500 to about 100,000 grams/mole (g/mol), specifically about 1,000 to about 75,000 g/mol, more specifically about 1,500 to about 50,000 g/mol, and still more specifically about 2,000 to about 25,000 g/mol.

The polyarylenes for crosslinking are further characterized by relatively high tensile strength and Young's modulus (stiffness), as well as ductile mechanical deformation behavior. The polyarylenes can have a tensile yield strength of 18,000 to 25,000 psi (124 to 172 MPa), a tensile modulus of 700 to 900 KPsi (4.8 to 6.2 GPa), and a tensile elongation of 5%, 7%, 8%, or higher. The polyarylenes for crosslinking can further have a compressive strength of up to 35,000 psi (242 MPa).

A combination of different polyarylenes can be used for crosslinking, for example polyarylenes of different molecular weights, different substitution patterns, different viscosities, and/or different degrees of branching.

Exemplary polyarylenes that can be used include those generally known as "self-reinforcing polyphenylene," which are commercially available under the tradename PrimoSpire® PR-250 from Solvay Advanced Polymers.

In another embodiment, the polymer component includes the crosslinked product of a polyphenylene sulfide and a polyphenylsulfone. That is, in the crosslinked product, the polyphenylene sulfide is crosslinked to the polyphenylsulfone.

The polyphenylene sulfide used for crosslinking to the polyphenylsulfone comprises repeating units of formula (4)

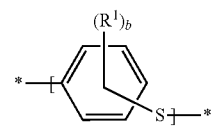

wherein
R$^1$ is a substituent on the phenyl group, wherein each R$^1$ is independently hydrogen, halogen, C1-C20 alkyl group, C1-C20 alkoxy group, C1-C20 haloalkyl group, C3-C20 cycloalkyl group, C2-C20 heterocycloalkyl group, C3-C20 cycloalkyloxy group, C3-C20 aryl group, C3-C20 aralkyl group, C3-C20 aryloxy group, C3-C20 aralkyloxy group, C2-C20 heteroaryl group, C2-C20 heteroaralkyl group, C2-C20 alkenyl group, C2-C20 alkynyl group, amine group, amide group, alkyleneamine group, aryleneamine group, alkenyleneamine group, nitro, cyano, carboxylic acid or a salt thereof, phosphonic acid or a salt thereof, or sulfonic acid or a salt thereof;
b is an integer from 0-4, provided that the valence of the phenyl group is not exceeded; and
x is greater than about 10.

Each repeating unit can have a different or same attachment position of the sulfur atom to the phenyl ring in the repeating unit of formula (4). In addition, each unit can have a different pattern of substitution on the phenyl groups, for example a combination of units that is unsubstituted (b=0) and units that are substituted (b>0).

In a specific embodiment, the polyphenylene sulfides used for crosslinking are polyphenylene sulfides of formula (5)

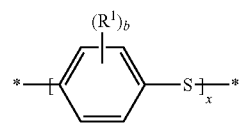

wherein
each R1 is the same or different, and is as defined in formula (4),
b is as defined in formula (4), and
x is as defined in formula (4).

In an embodiment, each R$^1$ is the same or different, and is a linear or branched C1-C10 alkyl, linear or branched C2-C10 alkenyl, linear or branched C2-C10 alkynyl, C6-C18 aryl, C7-C20 alkylaryl, C7-C20 arylalkyl, C5-C10 cycloalkyl, C5-C20 cycloalkenyl, linear or branched C1-C10 alkylcarbonyl, C6-C18 arylcarbonyl, halogen, nitro, cyano, carboxylic acid or a salt thereof, phosphonic acid or a salt thereof, or sulfonic acid or a salt thereof In another embodiment each $R^1$ is the same or different, and is a linear or branched C1-C6 alkyl, C6-C12 aryl, C7-C13 alkylaryl, C7-C13 arylalkyl, linear or branched C1-C6 alkylcarbonyl, C6-C12 arylcarbonyl, C7-C13 alkylarylenecarbonyl, C7-C13 arylalkylene carbonyl, halogen, nitro, cyano, carboxylic acid or a salt thereof, phosphonic acid or a salt thereof, or sulfonic acid or a salt thereof, and b is an integer from 0 to 4, specifically 0 to 3, 0 to 2, or 0 to 1.

In another embodiment each $R^1$ is the same or different, and is a linear or branched C1-C6 alkyl, C6-C12 arylcarbonyl, or halogen, and b is an integer from 0 to 4, specifically 0 to 3, 0 to 2, or 0 to 1.

The polyphenylene sulfides can be linked through the meta, para, or ortho positions in the backbone of the polyphenylene sulfide. In an embodiment, the polyphenylene sulfide is of formula (6)

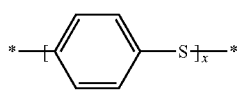

Formula (6)

wherein x is as defined in formula (5). Here, the sulfur atom attaches to the para position of the phenyl ring, and the phenyl ring has a full complement of hydrogen atoms, i.e., $R^1$ is hydrogen, and b is 4.

The linking of the unsubstituted phenylene sulfide units can be at least 90%, at least 95%, or 99% para, with the remaining linkages being ortho or meta. In an embodiment, the polyphenylene sulfides are linked at the para positions on the unsubstituted phenylene. In a further embodiment, the polyphenylene sulfides are linked at a combination of para, ortho, and meta positions on the substituted phenylene as shown in formula (4).

The polyphenylene sulfides can be linear or branched, having 1 or more, 2 or more, or 5 or more branching points per 1,000 carbon atoms along the polymer chain. In an embodiment, the polyphenylene sulfides are linear, having 10 or fewer, 5 or fewer, 2 or fewer, or 1 or fewer branching points per 1,000 carbon atoms along the polymer chain. The thermoplastic polymer can be obtained and used in either pellet or powder form.

In an embodiment, the polyphenylene sulfides for crosslinking have a glass transition temperature (Tg) of about 70 to about 150° C. when not crosslinked to the polyphenylsulfones.

The polyphenylene sulfides for crosslinking can further have a weight average molecular weight (Mw) of about 500 to about 100,000 grams/mole (g/mol), specifically about 1,000 to about 75,000 g/mol, more specifically about 1,500 to about 50,000 g/mol, and still more specifically about 2,000 to about 25,000 g/mol.

The polyphenylene sulfides for crosslinking are further characterized by relatively high tensile strength and Young's modulus (stiffness), as well as ductile mechanical deformation behavior. The polyphenylene sulfides can have a tensile yield strength of 8,000 to 25,000 psi (110 to 172 MPa), a tensile modulus of 400 to 900 KPsi (3.4 to 6.2 GPa), and a tensile elongation of 1%, 5%, 7%, 8%, or higher. The polyphenylene sulfides for crosslinking can further have a compressive strength greater than 15,000 psi (103 MPa).

A combination of different polyphenylene sulfides can be used for crosslinking, for example polyphenylene sulfides of different molecular weights, different substitution patterns, different viscosities, and/or different degrees of branching.

Exemplary polyphenylene sulfides that can be used include those that are available from sources such as Chevron Phillips Chemical Company, Fortron Industries, and GE Plastics. Commercial grades of polyphenylene sulfides include those with the trade names PRIMEF®, RYTON®, FORTRON®, and SUPEC®.

According to an embodiment, the polyphenylene sulfide described above is crosslinked to polyphenylsulfone to form a crosslinked product.

The polyphenylsulfone used for crosslinking to the polyphenylene sulfide comprises repeating units of formula (7)

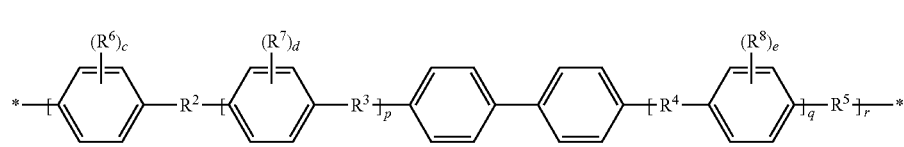

Formula (7)

wherein
each $R^2$, $R^3$, $R^4$, $R^5$ are independently —O— or —SO$_2$—, wherein at least one of $R^2$ to $R^5$ is —SO$_2$—, and at least one of $R^2$ to $R^5$ is —O—;
each $R^6$, $R^7$, and $R^8$ is a substituent on a phenyl group, and each $R^6$, $R^7$, and $R^8$ is independently hydrogen, halogen, alkyl group, alkoxy group, haloalkyl group, cycloalkyl group, heterocycloalkyl group, cycloalkyloxy group, aryl group, aralkyl group, aryloxy group, aralkyloxy group, heteroaryl group, heteroaralkyl group, alkenyl group, alkynyl group, amine group, amide group, alkyleneamine group, aryleneamine group, or alkenyleneamine group, nitro, cyano, carboxylic acid or a salt thereof, phosphonic acid or a salt thereof, or sulfonic acid or a salt thereof;
c, d, and e are integers which are each independently 0-4, provided that the valence of the phenyl group is not exceeded;
p and q are integers which are independently 0 or 1; and
r is an integer which is greater than about 10.
Each repeating unit of formula (7) can have a different or same attachment position of the substituents $R^6$, $R^7$, and $R^8$ on the phenyl ring. In addition, each unit can have a different pattern of substitution on the phenyl groups, for example a combination of units that is unsubstituted (c=d=e=0) and units that are substituted (at least one of c, d, b being greater than zero).

In an embodiment, each $R^6$, $R^7$, and $R^8$ is the same or different, and is a linear or branched C1-C10 alkyl, linear or branched C2-C10 alkenyl, linear or branched C2-C10 alkynyl, C6-C18 aryl, C7-C20 alkylaryl, C7-C20 arylalkyl, C5-C10 cycloalkyl, C5-C20 cycloalkenyl, linear or branched C1-C10 alkylcarbonyl, C6-C18 arylcarbonyl, halogen, nitro, cyano, carboxylic acid or a salt thereof, phosphonic acid or a salt thereof, or sulfonic acid or a salt thereof.

In another embodiment each $R^6$, $R^7$, and $R^8$ is the same or different, and is a linear or branched C1-C6 alkyl, C6-C12 aryl, C7-C13 alkylaryl, C7-C13 arylalkyl, linear or branched C1-C6 alkylcarbonyl, C6-C12 arylcarbonyl, C7-C13 alkylarylenecarbonyl, C7-C13 arylalkylene carbonyl, halogen, nitro, cyano, carboxylic acid or a salt thereof, phosphonic acid or a salt thereof, or sulfonic acid or a salt thereof, and each c, d, and e is an integer from 0 to 4, specifically 0 to 3, 0 to 2, or 0 to 1.

In another embodiment each $R^6$, $R^7$, and $R^8$ is the same or different, and is a linear or branched C1-C6 alkyl, C6-C12 arylcarbonyl, or halogen, and each c, d, and e is an integer from 0 to 4, specifically 0 to 3, 0 to 2, or 0 to 1.

In a specific embodiment, the polyphenylsulfone used for crosslinking to the polyphenylene sulfide includes at least 50 wt. % of a first repeating unit of formula (8), based on the weight of the polyphenylsulfone Formula (8)

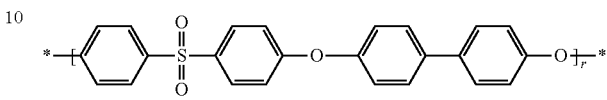

wherein r is an integer greater than about 10.

In another embodiment, the polyphenylsulfone includes a second repeating unit of formula (9), formula (10), formula (11), formula (12), or a combination thereof Formula (9)

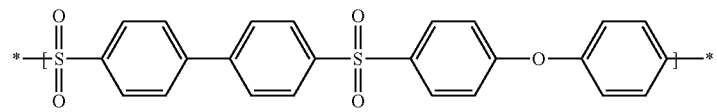

Formula (10)

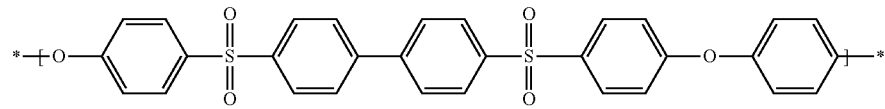

Formula (11)

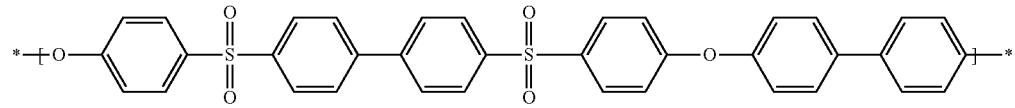

Formula (12)

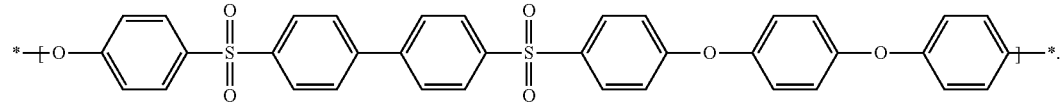

In a further embodiment, the polyphenylsulfone is a copolymer of formula (8) and formula (13), formula (14), formula (15), or a combination thereof Formula (13)

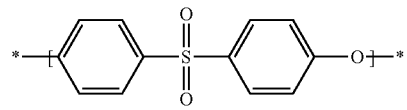

Formula (14)

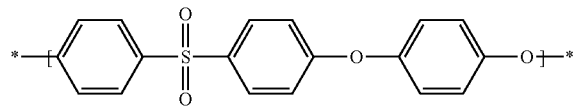

Formula (15)

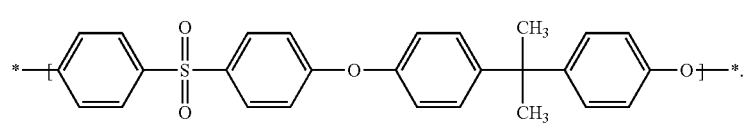

The polyphenylsulfones contain 50% or more, 85% or more, 90% or more, 95% or more, or 99% or more of the units of formula (7) based on the total number of repeat units in the polymers. Other units that can be present. According to an embodiment, the polyphenylsulfone is a copolymer of at least 50% of formula (7) and one or more of formula (8), formula (9), formula (10), formula (11), formula (12), formula (13), formula (14), formula (15), or a combination thereof.

The polyphenylsulfones can be linear or branched, having 1 or more, 2 or more, or 5 or more branching points per 1,000 carbon atoms along the polymer chain. In an embodiment, the polyphenylsulfones are linear, having 10 or fewer, 5 or fewer, 2 or fewer, or 1 or fewer branching points per 1,000 carbon atoms along the polymer chain. The thermoplastic polymer can be obtained and used in either pellet or powder form.

In an embodiment, the polyphenylsulfones for crosslinking with the polyphenylene sulfides have a glass transition temperature (Tg) of greater than about 175° C. when not crosslinked to the polyphenylsulfones, specifically from about 200° C. to about 280° C., and more specifically from about 255° C. to about 275° C.

The polyphenylsulfones for crosslinking can further have a weight average molecular weight (Mw) of about 500 to about 100,000 grams/mole (g/mol), specifically about 1,000 to about 75,000 g/mol, more specifically about 1,500 to about 50,000 g/mol, and still more specifically about 2,000 to about 25,000 g/mol.

The polyphenylsulfones for crosslinking are further characterized by relatively high tensile strength and Young's modulus (stiffness), as well as ductile mechanical deformation behavior. The polyphenylsulfones can have a tensile yield strength of 10152 to 21,755 psi (70 to 150 MPa), a tensile modulus of 315 to 500 KPsi (2.2 to 3.5 GPa), and a tensile elongation of 5%, 7%, 8%, or higher. The polyphenylsulfones for crosslinking can further have a compressive strength greater than 14,350 psi (98 MPa).

A combination of different polyphenylsulfones can be used for crosslinking, for example polyphenylsulfones of different molecular weights, different substitution patterns, different viscosities, and/or different degrees of branching.

Exemplary polyphenylsulfones that can be used include those that are available from sources such as Solvay Specialty Polymers, Quadrant EPP, Centroplast Centro, Duneon, GEHR Plastics, Westlake Plastics, and Gharda Chemicals. Commercial grades of polyphenylsulfones include those with the trade names RADEL®, UDEL®, ULTRASON®, and GAFONE®.

According to an embodiment, the composition can be made by mixing the polyarylene of formula (1) with the mesoporous silicate and a crosslinking agent at a temperature and for a time effective to form the composition. In another embodiment, the composition can be made by mixing the polyphenylene sulfide and the polyphenylsulfone with the mesoporous silicate and a crosslinking agent at a temperature and for a time effective to form the composition.

As described above, the high temperature elastomers, in particular the crosslinked polyarylenes and crosslinked polyphenylene sulfide and polyphenylsulfone, are prepared by oxidative crosslinking in the presence of a molecular crosslinking agent. Crosslinking agents include oxygen and solid or liquid crosslinking agents such as peroxides or sulfur.

When oxygen is used as a crosslinking agent for polyarylenes, the oxygen can be provided in the form of a gas as either pure oxygen or in a mixture of gases. Where a mixture of gases is used, oxygen can be combined with inert gas such as nitrogen, helium, argon, or the like. Other gases can be present, for example carbon dioxide or the like. In an embodiment, air is used. The crosslinking can be carried out at ambient pressure, at a partial pressure lower than ambient, or at elevated pressures (greater than 1 atmosphere).

Peroxides can be used for crosslinking, for example organic peroxides such as ketone peroxides, diacyl peroxides, dialkyl peroxides, peroxyesters, peroxyketals, hydroperoxides, peroxydicarbonates, and peroxymonocarbonates. Examples of specific peroxides include 2,2-bis(t-butylperoxy)butane, 1,3 1,4-bis(tert-butylperoxyisopropyl)benzene, dicumyl peroxide, tert-butylcumylperoxide, 2,5-dimethyl-2, 5-di-(tert-butylperoxy)hexane, n-butyl-4,4'-di(tert-butylperoxy)valerate, 1,1'-di(tert-butylperoxy)-3,3,5-trimethylcyclohexane, and the like; or inorganic peroxides such as calcium peroxide, zinc peroxide, hydrogen peroxide, peroxydisulfate salts, and the like. Commercially available peroxides include those marketed by Arkema, Inc. under the tradename DI-CUP® including, DI-CUP® dialkyl peroxide, DI-CUP® 40C dialkyl peroxide (on calcium carbonate support), DI-CUP® 40K dialkyl peroxide, DI-CUP® 40KE dialkyl peroxide; and alkyl diperoxy compounds including 2,5-dimethyl-2,5-di(t-butylperoxy) hexane and marketed by Akzo-Nobel under the tradename TRIGONOX® 101. Effective amounts of peroxides can be readily determined by one of skill in the art depending on factors such as the reactivity of the peroxide and the polyphenylene sulfide and polyphenylsulfone, the desired degree of cure, and like considerations, and can be determined without undue experimentation. For example, peroxides can be used in amounts of about 1 to about 10 parts per 100 parts by weight of the polyphenylene sulfide and polyphenylsulfone. Sulfur can also be used for crosslinking, for example, elemental sulfur, hydrogen sulfide, or sulfur donor agents. Examples of sulfur donor agents include alkyl polysulfides, thiuram disulfides, and amine polysulfides. Some non-limiting examples of suitable sulfur donor agents are 4,4'-dithiomorpholine, dithiodiphosphorodisulfides, diethyldithiophosphate polysulfide, alkyl phenol disulfide, tetramethylthiuram disulfide, 4-morpholinyl-2-benzothiazole disulfide, dipentamethylenethiuram hexasulfide, and caprolactam disulfide. Combinations of the foregoing crosslinking agents can be used.

In another embodiment, sulfur can be used in amounts of about 1 to about 10 parts per 100 parts by weight of the polyphenylene sulfide and polyphenylsulfone composition. Sulfur can also be used for crosslinking, for example elemental sulfur or hydrogen sulfide. Combinations of the foregoing crosslinking agents can be used.

According to an embodiment, the crosslinked product includes sulfur incorporated into the crosslinks in an amount from about 0.01 wt. % to about 5 wt. %, specifically about 0.05 wt. % to about 1.5 wt. %, and more specifically about 0.09 wt. % to about 1.1 wt. % based on the weight of the polyphenylene sulfide and the polyphenylsulfone.

Other agents to initiate or accelerate cure as known in the art can also be present, for example amine accelerators, sulfonamide accelerators, and the like. Effective amounts of crosslinking agent, activators, and the like are known in the art and can be determined without undue experimentation.

As with oxygen, crosslinking in the presence of a peroxide, sulfur, or other molecular crosslinking agent can be carried out at ambient pressure, at a partial pressure lower than ambient, or at elevated pressures (greater than 1 atmosphere). When peroxides, sulfur, or another gas, solid, or liquid crosslinking agent is used, the agent is generally compounded with the combination of the polyarylene and the mesoporous silicate or with the combination of polyphenylene sulfide, polyphenylsulfone, and the mesoporous silicate, which are then optionally shaped and crosslinked. The crosslinking agent can be pre-dispersed in a master batch and added to the combinations to facilitate mixing.

Crosslinking with peroxides, sulfur, or other crosslinking agents is thermally induced and, thus, is carried out at elevated temperatures for a time and at a pressure effective to achieve the desired degree of crosslinking. For example, crosslinking is carried out at about 150° C. to about 600° C. (or higher), about 200° C. to about 500° C., or more specifically about 300° C. to about 450° C. The crosslinking is conducted for a total time of about 200 hours or less, about 72 hours or less, about 48 hours or less, or about 1 to about 48 hours. In an embodiment, crosslinking is conducted at about 300° C. to about 375° C. for about 1 to about 20 hours, specifically about 2 to about 6 hours, in air atmosphere at ambient pressure. When the polyarylene or polyphenylene sulfide and polyphenylsulfone combination is molded prior to crosslinking, polyarylene or the polyphenylene sulfide and polyphenylsulfone combination may be first molded at high temperature (e.g., 200-500° C., or 300 to 450°), followed by crosslinking as described above.

According to an embodiment, the method includes foaming a combination of the polyarylene and mesoporous silicate or a combination of the polyphenylene, the polyphenylsulfone, and mesoporous silicate prior to crosslinking. A further embodiment of the method includes shaping a combination of the polyarylene and the mesoporous silicate or a combination of the polyphenylene, the polyphenylsulfone, and the mesoporous silicate prior to crosslinking.

The degree of crosslinking can be regulated by controlling reaction parameters such as crosslinking temperature, crosslinking time, and crosslinking environment, for example, varying the relative amounts of the polyarylene, polyphenylene sulfide, polyphenylsulfone, and crosslinking agent. Degree of cure can be monitored using a number of methods. Once crosslinked, these polymers do not dissolve in solvents. In an advantageous feature, solubility can be used to examine whether or not a polymer is crosslinked. Other methods that can be used to examine molecular crosslinking include dynamic mechanical analysis (DMA). This method monitors and records material modulus at different temperatures. For amorphous thermoplastic polymers, the modulus drops to near zero when the temperature is increased to above the Tg. Material tends to flow at high temperature above Tg. In contrast, crosslinked polymers will maintain a rubber-like plateau having relatively high modulus at a wide temperature range above its glass transition temperature Crosslinking can be partial, i.e., localized, or full across the mass of the polyarylene or polyphenylene sulfide and polyphenylsulfone. Localized cure can be achieved based on the degree of exposure of the polyarylene, polyphenylene sulfides and polyphenylsulfones to the crosslinking agent (e.g., sulfur) during crosslinking. For example, where the polyarylene or the polyphenylene sulfides and polyphenylsulfones are provided as a pellet or particle, partial cure may be obtained where only the outermost, exposed surface or layer of a particle of the crosslinked polyarylene or crosslinked polyphenylene sulfide and polyphenylsulfone is crosslinked, while the interior of the pellet or particle is uncrosslinked. The portion crosslinked, in this instance, corresponds to the diffusion depth of the crosslinking agent into the pellet or particle during cure and varies with variation in cure condition, i.e., temperature, pressure, oxygen concentration, and time.

In another embodiment, the polymer component and the mesoporous silicate are compounded with an additive prior to crosslinking. "Additive" as used herein includes any compound added to the combination of the polymer component and the mesoporous silicate to adjust the properties of the polymer component, for example a blowing agent to form a foam, or processing aid, provided that the additive does not substantially adversely impact the desired properties of the polymer component.

A processing aid is a compound included to improve flow, moldability, and other properties of the crosslinked thermoplastic material. Processing aids include, for example an oligomer, a wax, a resin, a fluorocarbon, or the like. Exemplary processing aids include stearic acid and derivatives, low molecular weight polyethylene, and the like. Combinations comprising at least one of the foregoing processing aids can be used.

The polyphenylene sulfides and polyphenylsulfones as well as polyarylene can be crosslinked together alone or in the presence of another polymer in order to obtain the desired properties of the crosslinked product. However, the presence of other polymers may reduce chemical resistance. Thus, in an embodiment, no other polymer is present during crosslinking of the polyphenylene sulfides and polyphenylsulfones or during the crosslinking of polyarylenes. If used, in order to maintain the desired properties of the crosslinked product, any amount of the additional polymers are limited, being present for example in amount of 0.01 to 20 weight percent (wt. %), 0.1 to 10 wt. %, or 1 to 5 wt. % of the total weight of the polymers present. For example, if used, aromatic thermoplastic polymers can be present, such as aromatic polyamides, polyimides, polyetherimides, polyaryletherketones (PAEK), polyetherether ketones (PEEK), polyether sulfones (PESU), polyphenylene sulfone ureas, self-reinforced polyphenylene (SRP), or the like, or combinations comprising at least one of the foregoing. Polymers containing oxygen include, for example, acetal resins (e.g., polyoxymethylene (POM)), polyester resins (e.g., poly(ethylene terephthalate) (PET), poly(butylene terephthalate) (PBT), and poly(ethylene naphthalate) (PEN)), polyarylates (PAR), poly(phenylene ether) (PPE), polycarbonate (PC), aliphatic polyketones (e.g., polyketone (PK)), poly(ether ketones) (polyetherketone (PEK), polyetherketoneketone (PEKK), and polyetherketone etherketone ketone (PEKEKK)), and acrylic resins (e.g., polymethylmethacrylate (PMMA)) can be used. The additional polymer can be linear or branched, homopolymers or copolymers, and used alone or in combination with one or more other aromatic thermoplastic polymers. Copolymers include random, alternating, graft, and block copolymers, the block copolymers having two or more blocks of different homopolymers, random copolymers, or alternating copolymers. The thermoplastic polymers can further be chemically modified to include, for example, functional groups such as halogen, alcohol, ether, ester, amide, etc. groups, or can be oxidized, hydrogenated, and the like. A reactive elastomer or fluoropolymer can be blended with the polyphenylene sulfides and polyphenylsulfones before crosslinking, and graft to the polyphenylene sulfides and polyphenylsulfones during their crosslinking to increase flexibility of the crosslinked product. Examples of reactive elastomers or fluoropolymers include polytetrafluoroethylene (PTFE), nitrile-butyl rubber (NBR), hydrogenated nitrile-butyl rubber (HNBR), high fluorine content fluoroelastomers rubbers such as those in the FKM family and marketed under the tradename VITON® fluoroelastomers (available from FKM-Industries) and perfluoroelastomers such as FFKM (also available from FKM-Industries) and marketed under the tradename KALREZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyvinylalcohol (PVA), and the like, and combinations comprising at least one of the foregoing polymers.

Prior to crosslinking, or after partial crosslinking, the combination of polyarylenes and mesoporous silicates and the combination of polyphenylene sulfides, polyphenylsulfones, mesoporous silicates can optionally be shaped to provide a preform that is then crosslinked or further crosslinked. As described in more detail below, crosslinking renders the crosslinked product insoluble in most solvents. The high glass transitions temperatures of the crosslinked product also renders it non-thermoplastic. For some applications, therefore, it is advantageous to first shape the polymer and mesoporous silicate combinations into the desired article prior to crosslinking. A variety of methods can be used to shape the combination the mesoporous silicate and the polyarylene or the combination of the mesoporous silicate, the polyphenylene sulfide and the polyphenylsulfone, for example, molding, casting, extruding, foaming, and the like. Accordingly, in an embodiment, an article is manufactured by optionally compounding the polyarylene with a mesoporous silicate, a crosslinking agent and one or more optional additives; shaping the optionally compounded composition to form a preform; and crosslinking the polyarylene to form the article. In another embodiment, an article is manufactured by optionally compounding the polyphenylene sulfide and polyphenylsulfone composition with a mesoporous silicate, a crosslinking agent and one or more optional additives; shaping the optionally compounded composition to form a preform; and crosslinking the polyphenylene sulfides and polyphenylsulfones to form the article.

Alternatively, a composition containing the mesoporous silicate and the crosslinked product can be shaped after crosslinking is complete by physical means such as cutting, grinding, or machining.

The combination of the mesoporous silicate and the polyarylene and the combination of the mesoporous silicate and the polyphenylene sulfide and the polyphenylsulfone can also be shaped by foaming, and then the polymers are crosslinked after foaming, or after the foam is further shaped, for example by casting or molding the blown foam. For example a composition containing polyarylene and mesoporous silicate or a composition containing the polyphenylene sulfide, polyphenylsulfone, and mesoporous silicate can be extruded with 1 to 10 wt. % of a chemical or physical blowing agent, such as water, an inert gas (e.g., argon or nitrogen), C1-C6 hydrochlorofluorocarbons, C1-C6 hydrocarbons (e.g., propane or butane), C1-05 alcohols (e.g., methanol or butanol), C1-C4 ketones (e.g., acetone), and the like. A nucleating agent can be present to regulate the size and number of cells. Alternatively, particulate water-soluble salts, for example sodium chloride, potassium chloride, potassium iodide, sodium sulfate, or other salt having a high solubility in water can be used to form pores, wherein the composition containing the salts is crosslinked, and the salts are removed after crosslinking, for example by soaking and/or extracting the salts from the crosslinked product with a suitable solvent (such as water, where a water-soluble nucleating agent is used) to form pores. In an embodiment, the foams are open cell foams where the voids in the foam are in fluid communication. Alternatively a closed cell foam can be made where the cells are not in communication. In this case, some of the cells can contain fluid. Examples of the fluid include air, inert gas, sulfur-containing compounds, oxygen-containing compounds, or a combination thereof. The fluid can be from a blowing agent or entrapment of, e.g., ambient gases in the closed cells. Alternatively, foams of the crosslinked product can be shaped after crosslinking is complete by physical means such as cutting, grinding, or machining.

In another embodiment, the compositions can be manufactured to form shape memory materials, i.e., having thermally activated shape memory properties wherein the material is thermally activated between an actuated and unactuated shape. In this embodiment, the shape memory material can be manufactured by optionally compounding the polyarylene with a mesoporous silicate, a crosslinking agent and one or more optional additives or optionally compounding the polyphenylene sulfide and polyphenylsulfone composition with mesoporous silicate, a crosslinking agent and one or more optional additives; compacting the optionally compounded composition at a low temperature (e.g., 50° C. or less, or room temperature); crosslinking the compacted composition described above to form an unactuated shape; compression molding the crosslinked product at a temperature at or above the Tg of the crosslinked product to form an actuated shape of the crosslinked product; allowing the crosslinked product having the actuated shape to cool in the mold, or de-molding at a temperature at or above the Tg of the crosslinked product and allowing the crosslinked product to cool after demolding to provide a crosslinked product having an actuated shape, i.e., after de-molding the crosslinked product maintains the actuated shape since is cooled to below the Tg of the crosslinked product more rapidly than the time it takes to convert from the actuated shape to the unactuated shape. The temperature used during crosslinking the composition and the heating at or above the Tg of the crosslinked article can be the same, such that the crosslinking and the heating can be performed in the same step. The crosslinked product has thermally activated shape memory properties in that heating to at or above the Tg of the crosslinked product causes the crosslinked product to assume an unactuated shape. It is also possible to form a shape memory foam by this method, by forming a foam prior to crosslinking.

An addition of a relatively smaller amount of mesoporous silicate having an average pore size of 5 nanometers to 50 nanometers to a crosslinked product of a polyphenylene sulfide (PPS) and a polyphenylsulfone (PPSU) significantly enhances the mechanical properties of the crosslinked product. As shown in FIG. 1, a crosslinked PPS-PPSU loaded with 10 phr of mesoporous silica (Silapore®) has similar tensile strength as compared to a crosslinked PPS-PPSU loaded with 40 phr carbon black N120. As used herein, phr means parts by weight per hundred parts by weight of the polymer component. The tensile properties were measured at 500 F with an MTS mechanical tester unless noted otherwise.

Figure 2:
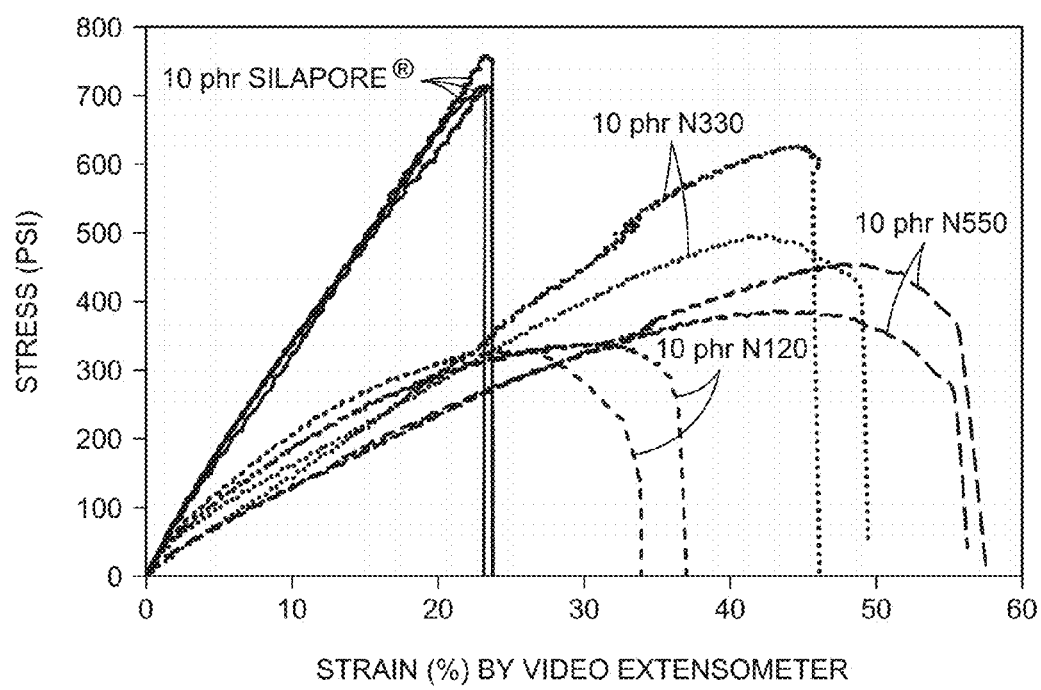
FIG. 2 shows stress-strain curves of crosslinked polyphenylene compositions containing 10 phr mesoporous silica or 20 phr carbon black of various grades.

Similar effects have been observed for crosslinked polyarylenes. As shown in FIG. 2, a crosslinked polyarylene loaded with 10 phr mesoporous silica (Silapore®) noticeably surpassed crosslinked polyarylene loaded with 20 phr of various grades of carbon black (N120 and N3330).

Figure 3:
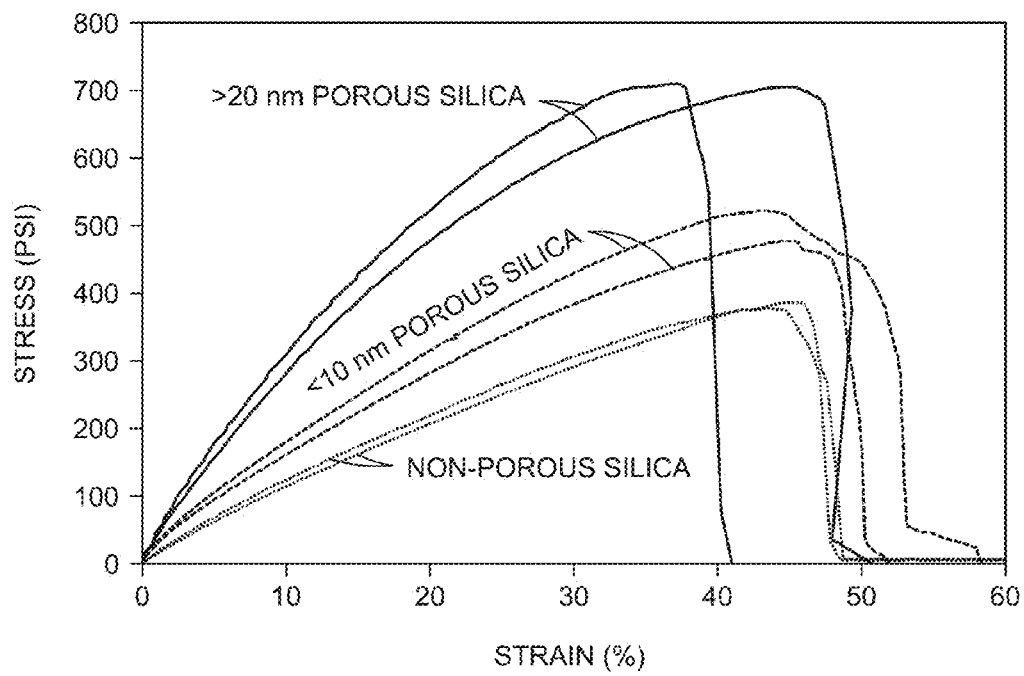
FIG. 3 shows a stress-strain curve of a crosslinked polyphenylene composition without mesoporous silica, and stress-strain curves of crosslinked polyphenylene compositions containing mesoporous silica having different average pore sizes.

The effects of pore size of mesoporous silicate on the improvement of mechanical properties have been evaluated. FIG. 3 shows the stress-strain curves of crosslinked polyarylenes loaded with same amounts of nonporous silica, mesoporous silica having an average pore size of greater than 10 nm, and mesoporous silica having an average pore size of greater than 20 nm. Among the three samples, mesoporous silica having an average pore size of greater than 20 nm provides the best results. Identification of optimal pore sizes allows the achievement of maximum tensile strength with minimal loading, which can lead to a product having a lower density.

Figure 4:
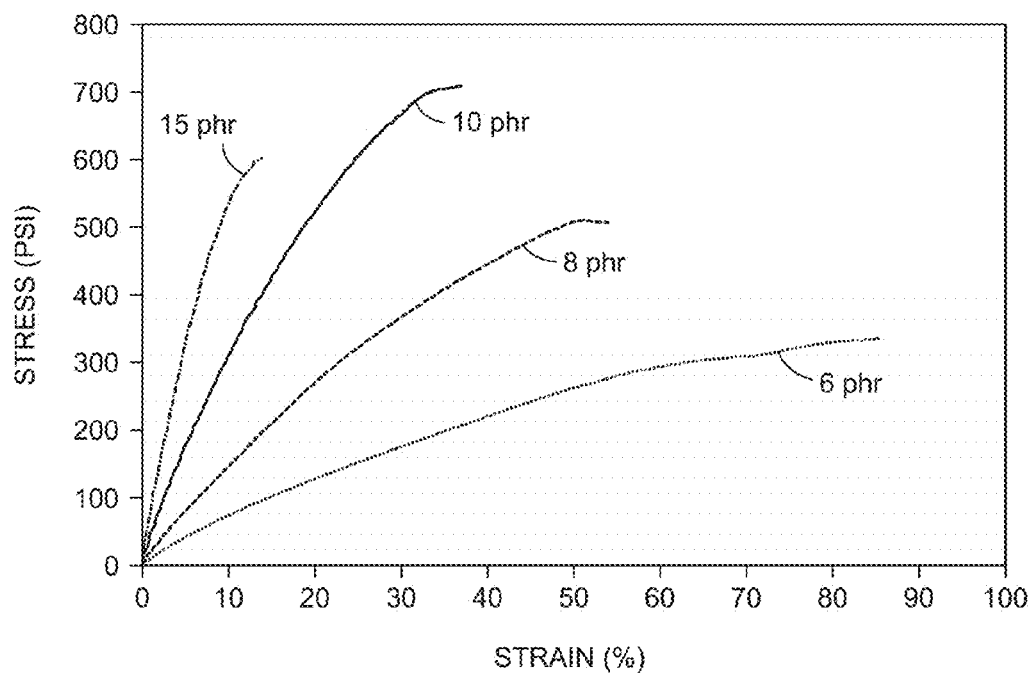
FIG. 4 shows stress-strain curves of crosslinked polyphenylene compositions containing 6 phr, 8 phr, 10 phr, or 15 phr mesoporous silica.

The effects of the amounts of the mesoporous silica to the strength and elongation of crosslinked polyarylenes are also evaluated. FIG. 4 shows the stress-strain curves of crosslinked polyarylenes loaded with 6 phr, 8 phr, 10 phr, and 15 phr mesoporous silica. The results indicate that when the crosslinked polyarylene is reinforced with 10 phr of mesoporous silica, a desired balance of strength and elongation is achieved.

Figure 5:
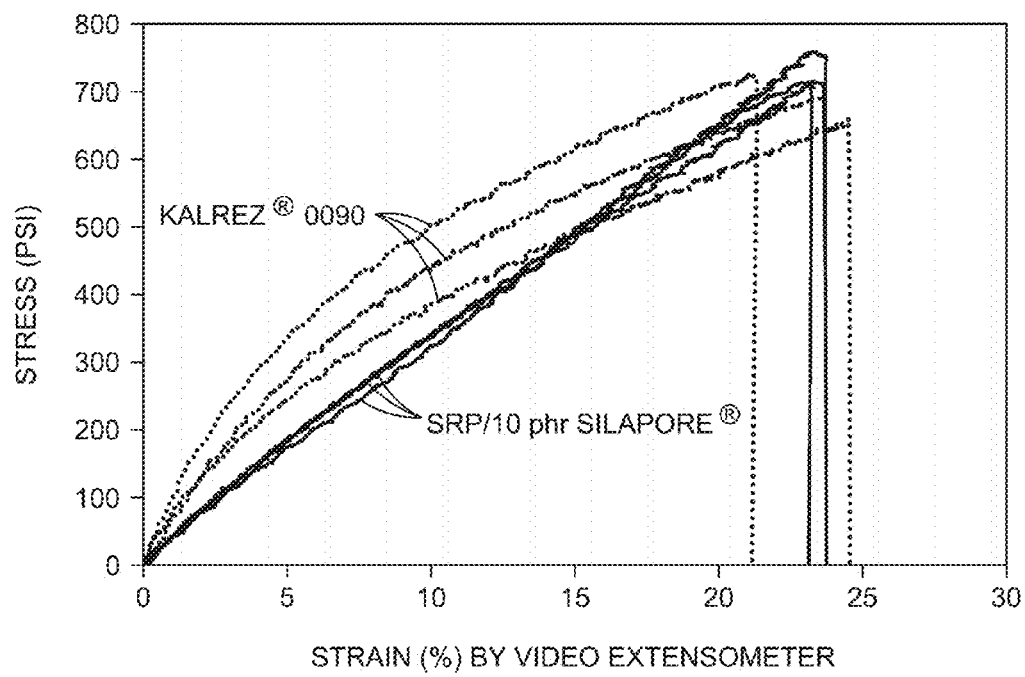
FIG. 5 shows stress-strain curves of a crosslinked polyphenylene composition containing 10 phr mesoporous silica and stress-strain curves of a perfluoroelastomer (FFKM, KALREZ® 0090)

FIG. 5 compares the strength and elongation performance of a composition containing crosslinked polyarylene and 10 phr mesoporous silica having an average pore size of greater than 10 nm versus the strength and elongation performance of a perfluoroelastomer (FFKM, KALREZ® 0090). The results show that the strength and elongation properties of the composition of the disclosure are comparable to those of the perfluoroelastomer FFKM.

Figure 6:
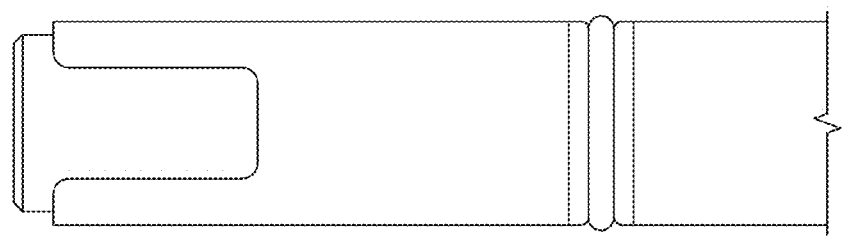
FIG. 6 shows an 'O'-ring made from a crosslinked polyphenylene composition containing mesoporous silica in a testing fixture.

A composition containing a crosslinked polyarylene and 10 phr of mesoporous silica having an average pore size of greater than 10 nm is rigged in the form of an 'O'-ring. The 'O'-ring is fit in a testing fixture as shown in FIG. 6. The testing fixture held 3000 psi differential pressure at 500 F for uninterrupted 10 hours, which indicates that reinforced elastomer composition has optimum strength.

Figure 7:
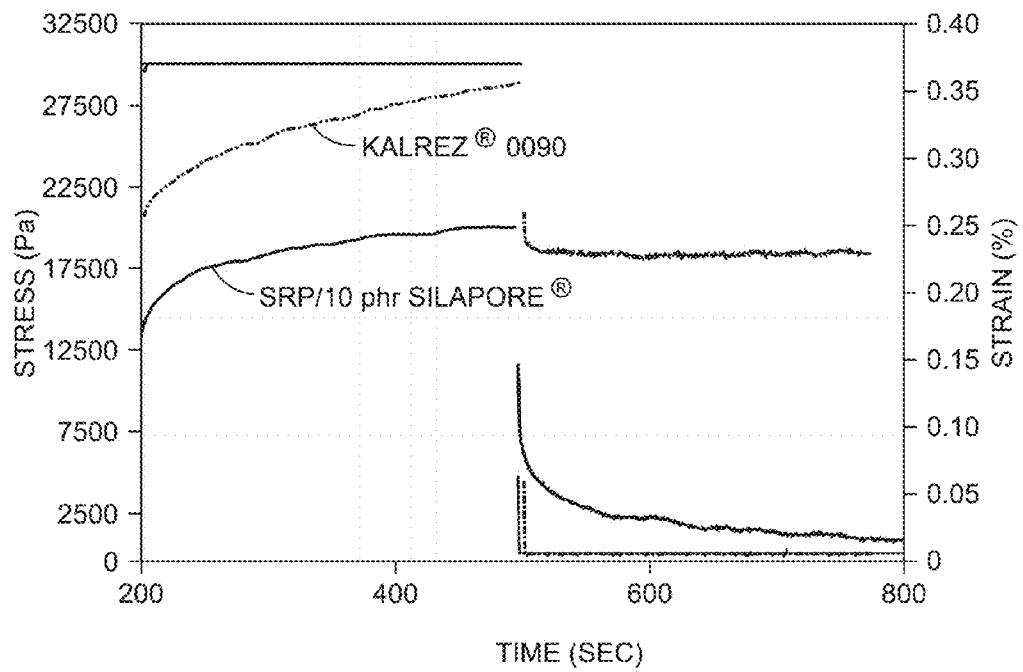
FIG. 7 shows creep relaxation behavior of a crosslinked polyphenylene composition containing mesoporous silica in comparison with a perfluoroelastomer (FFKM, KALREZ® 0090)

The compositions containing mesoporous silica also have excellent elastomeric properties at high temperatures. A creep relaxation test with a constant stress level was performed (using a dynamic mechanical analyzer) to compare the elastomeric property of crosslinked polyarylene reinforced with mesoporous silica with that of a perfluoroelastomer (FFKM, KALREZ® 0090) at 500 F and the results are shown in FIG. 7. As shown in FIG. 7, the mesoporous silica reinforced polyarylene validates the crosslinking present in the sample and exhibits comparable creep recovery behavior to the perfluoroelastomer.

Figure 8:
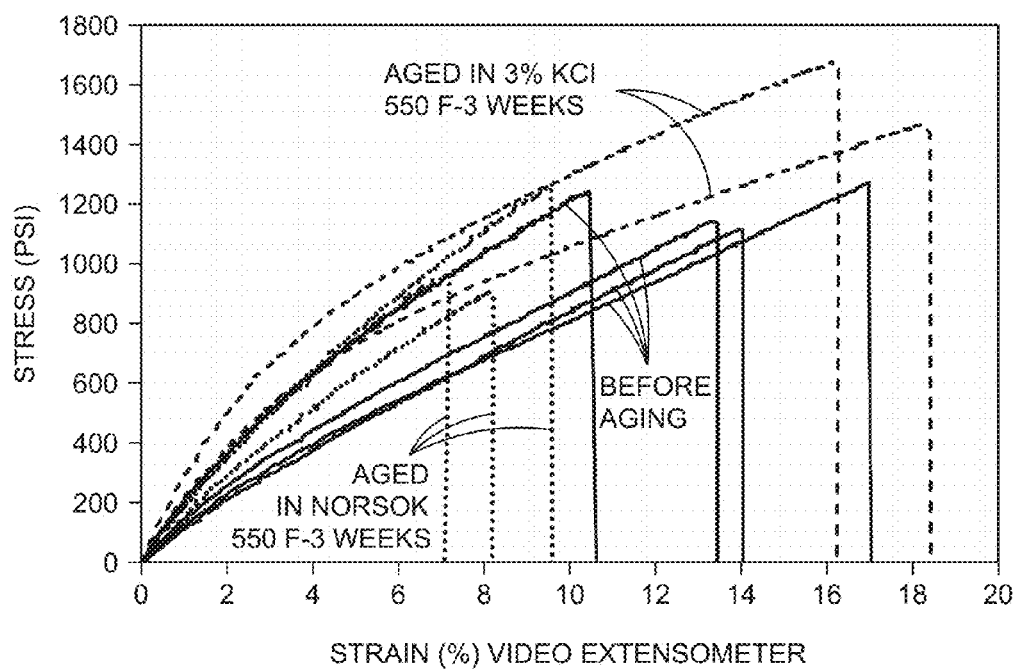
FIG. 8 shows the stress-strain curves of crosslinked polyphenylene compositions containing mesoporous silica or a perfluoroelastomer (FFKM, KALREZ® 0090) before aging, after aging in 3% KCl at 550 F for three weeks, or after aging in a Norsok fluid at 550 F for three weeks.

In addition to excellent elastomeric properties at high temperatures, the reinforced compositions have excellent chemical resistance. Fluid compatibility testing at 550 F was performed with 3% KCl and Norsok fluid against perfluoroelastomer (FFKM, KALREZ® 0090) and the results are shown in FIG. 8. The mesoporous silica reinforced crosslinked polyarylene showed minimum change in properties after 3 weeks, whereas the perfluoroelastomer was degraded and untestable. Carbon black-filled crosslinked polyarylene showed worse aging performance due to hardening.

The reinforced compositions are useful for preparing elements for downhole applications. The downhole articles comprising the reinforced compositions can be a single component article. In an embodiment, the downhole articles inhibit flow. In another embodiment, the downhole articles are pumpable within a downhole environment.

Illustrative articles that inhibit flow include seals, compression packing elements, expandable packing elements, O-rings, bonded seals, bullet seals, sub-surface safety valve seals, sub-surface safety valve flapper seal, dynamic seals, V-rings, back up rings, drill bit seals, electric submersible pump seals.

Illustrative articles that are pumpable within a downhole environment include plugs, bridge plugs, wiper plugs, frac plugs, components of frac plugs, polymeric plugs, disappearing wiper plugs, cementing plugs, swabbing element protectors, buoyant recorders, pumpable collets.

In an embodiment, the element is a packer element, a blow out preventer element, a submersible pump motor protector bag, a sensor protector, a sucker rod, an O-ring, a T-ring, a gasket, a sucker rod seal, a pump shaft seal, a tube seal, a valve seal, a seal for an electrical component, an insulator for an electrical component, a seal for a drilling motor, a seal for a drilling bit, or porous media such as a sand filter, or other downhole elements.

In a specific embodiment, a downhole seal, e.g., a packer element, includes reinforced compositions as described above. In an embodiment, the downhole seal is made by molding a combination of the mesoporous silicate and the polyarylene or a combination of the polyphenylene sulfide and polyphenylsulfone to form a preform; and crosslinking the preform to form the downhole seal.

In another specific embodiment the article, for example the downhole seal, can be a shape memory seal manufactured using the methods described above, for example by compression molding polyarylene compounded with mesoporous silicate, an optional crosslinking agent, and optional additive or by compression molding PPS and PPSU, compounded with mesoporous silicate, an optional crosslinking agent, and an optional additive; heating at a temperature that is at or above the Tg of the crosslinked product and that is effective to crosslink polyarylene or to crosslink the PPS to the PPSU; and demolding the seal at a temperature at or above the Tg of the crosslinked product to provide the shape memory seal having a first shape. In use, the seal is first installed at low temperature (e.g., at room temperature or below the Tg of the crosslinked product) and thus having its first shape; downhole, the seal is exposed to temperatures at or above the Tg of the crosslinked product, and thus assumes a second shape, for example a shape that effectively seals or occludes. Of course, other shape memory articles for downhole use can also be manufactured using this general method.

Alternatively, the elements can be manufactured from the reinforced composition by preparing the reinforced composition in particle or bulk form; comminuting the bulk form to particulates; optionally compounding the particulates with an additive; and forming the element from the compounded particulates, for example by molding, extrusion, or other methods. Comminuting the bulk reinforced product can be by any method, for example use of a mortar and pestle, ball mill, grinder, or the like, provided that the particle size of the resultant polymer is suitable for adequate mixing. The particle size is not particularly limited, for example the crosslinked product is produced or comminuted to a particle size of about 10 mesh or less, about 20 mesh or less, or about 40 mesh or less. The particles can be compounded with additional crosslinking agents, any of the additives described above, or other additives ordinarily used for the intended element.

The use of the terms "a," "an," "the," and similar referents in the context of the description and the claims are to be construed to cover both the singular and the plural, unless otherwise indicated herein or clearly contradicted by context. The terms "first," "second," and the like herein do not denote any order, quantity, or importance, but rather are used to distinguish one element from another. All ranges disclosed herein are inclusive of the endpoints, and the endpoints are independently combinable with each other.

As used herein, "combination" is inclusive of blends, mixtures, alloys, reaction products, and the like. "Elastomer" as used herein is a generic term for substances emulating natural rubber in that they stretch under tension, have a high tensile strength, retract rapidly, and substantially recover their original dimensions. The term includes combinations (physical mixtures) of elastomers, as well as copolymers, terpolymers, and multi-polymers.

All references cited herein are incorporated by reference in their entirety. While one or more embodiments have been shown and described, modifications and substitutions may be made thereto without departing from the spirit and scope of the invention. Accordingly, it is to be understood that the present invention has been described by way of illustrations and not limitation

What is claimed:

1. A composition comprising:
a polymer component comprising a crosslinked product of a polyarylene of formula (1)

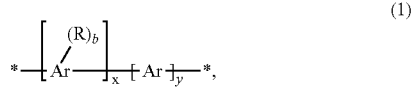

a crosslinked product of a polyphenylene sulfide and a polyphenylsulfone, or a combination comprising at least one of the foregoing crosslinked product; and
a mesoporous silicate having an average pore size of about 5 nanometers to about 50 nanometers;
wherein in formula (1) each Ar is the same or different, and is independently a C6-C32 aromatic group having only carbon atoms in the ring,
R is a substituent on the aromatic group wherein each R is the same or different, and each R is independently a C1-C20 hydrocarbyl group, C1-C20 hydrocarbyloxy group, C1-C20 hydrocarbylthio group, trialkylsilyl group, halogen, nitro group, cyano group, hydroxyl group, mercapto group, hydrocarbyl carbonyl group, formyl group, C1-C20 dihydrocarbyl ether group, carboxylic acid group or a salt thereof, carboxylic ester group, primary, secondary or tertiary amino group, primary or secondary aminocarbonyl group, phosphonic acid group or a salt thereof, sulfonic acid group or a salt thereof, polyalkyleneoxy group, or polyphenyleneoxy group,
b is an integer from 0-10, provided that the valence of Ar is not exceeded;
x and y are the same or different, and either x or y can be zero, provided that x+y is greater than about 10,
wherein the composition is free of a metal.

2. The composition of claim 1, wherein the polymer component comprises a crosslinked product of a polyarylene of formula (2)

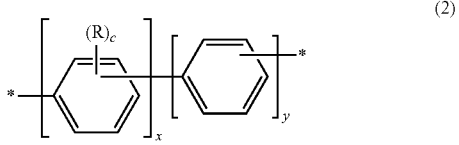

wherein
each R is the same or different, and is as defined in formula (1),
c is an integer from 0 to 4, and
x and y are the same or different, x or y can be zero, provided that x+y is greater than about 10.

3. The composition of claim 2, wherein each R is the same or different, and is a linear or branched C1-C6 alkyl, C6-C12 arylcarbonyl, or halogen, c is an integer from 1 to 4, and x and y are both greater than zero.

4. The composition of claim 2, wherein each R is C6-C12 arylcarbonyl, and c is 1.

5. The composition of claim 1, wherein the polymer component comprises a crosslinked product of a polyarylene of formula (2c)

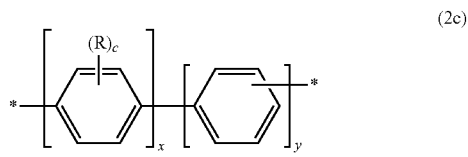

wherein R is benzoyl, c is 1, and both x and y are greater than zero.

6. The composition of claim 1, wherein the polymer component comprises a crosslinked product of a polyphenylene sulfide of formula (4) and a polyphenylsulfone

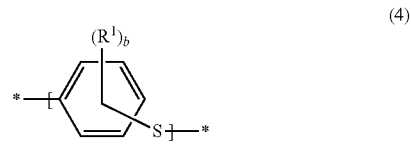

wherein
$R^1$ is a substituent on the phenyl group, wherein each $R^1$ is independently hydrogen, halogen, alkyl group, alkoxy group, haloalkyl group, cycloalkyl group, heterocycloalkyl group, cycloalkyloxy group, aryl group, aralkyl group, aryloxy group, aralkyloxy group, heteroaryl group, heteroaralkyl group, alkenyl group, alkynyl group, amine group, amide group, alkyleneamine group, aryleneamine group, or alkenyleneamine group, nitro, cyano, carboxylic acid or a salt thereof, phosphonic acid or a salt thereof, or sulfonic acid or a salt thereof;
b is an integer from 0-4, provided that the valence of the phenyl group is not exceeded; and
x is greater than about 10.

7. The composition of claim 6, wherein the polyphenylene sulfide is of formula (6)

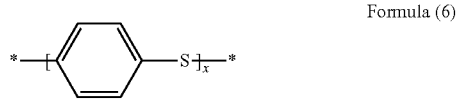

Formula (6)

wherein x is greater than about 10.

8. The composition of claim 6, wherein the polyphenylsulfone is of formula (7)

Formula (7)

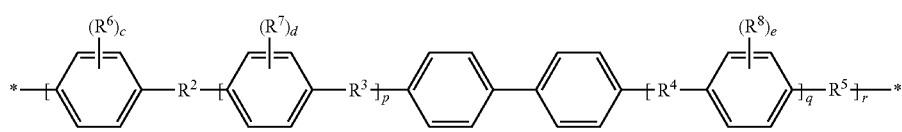

wherein
- each $R^2$, $R^3$, $R^4$, $R^5$ are independently —O— or —$SO_2$—, wherein at least one of $R^2$ to $R^5$ is —$SO_2$—, and at least one of $R^2$ to $R^5$ is —O—;
- each $R^6$, $R^7$, and $R^8$ is a substituent on a phenyl group, and each $R^6$, $R^7$, and $R^8$ is independently hydrogen, halogen, alkyl group, alkoxy group, haloalkyl group, cycloalkyl group, heterocycloalkyl group, cycloalkyloxy group, aryl group, aralkyl group, aryloxy group, aralkyloxy group, heteroaryl group, heteroaralkyl group, alkenyl group, alkynyl group, amine group, amide group, alkyleneamine group, aryleneamine group, or alkyleneamine group;
- c, d, and e are integers which are each independently 0-4;
- p and q are integers which are independently 0 or 1; and
- r is an integer which is greater than about 10.

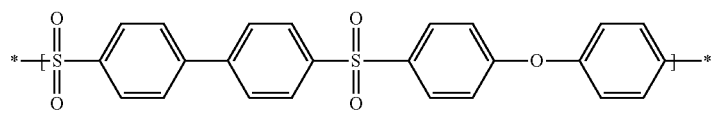

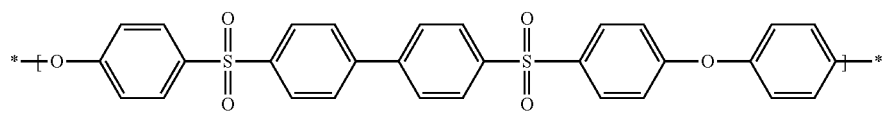

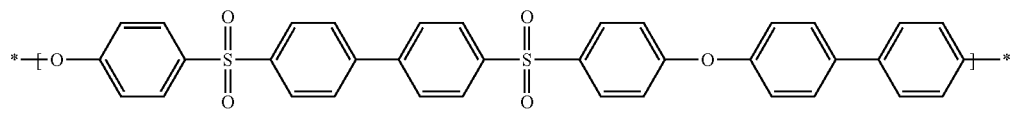

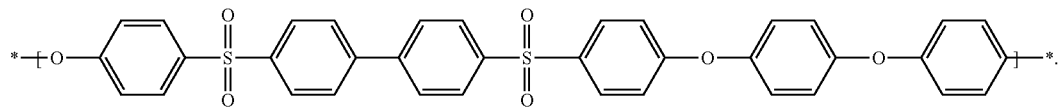

9. The composition of claim 6, wherein the polyphenylsulfone comprises at least 50% of a first repeating unit of formula (8), based on the total number of repeating units in the polyphenylsulfone Formula (8)

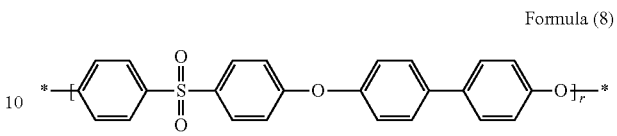

wherein r is an integer greater than about 10.

10. The composition of claim 9, wherein the polyphenylsulfone includes a second repeating unit of formula (9), formula (10), formula (11), formula (12), or a combination thereof Formula (9)

Formula (10)

Formula (11)

Formula (12)

11. The composition of claim 9, wherein the polyphenylsulfone is a copolymer of formula (8) and formula (13), formula (14), formula (15), or a combination thereof Formula (13)

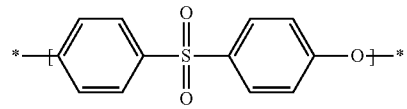

Formula (14)

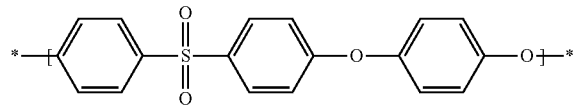

Formula (15)

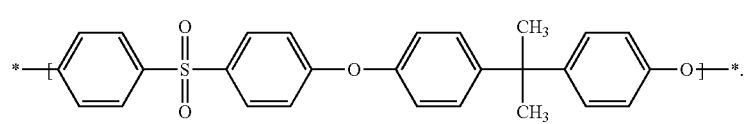

12. The composition of claim 1, wherein the polymer component comprises a crosslinked product of a polyphenylene sulfide and a polyphenylsulfone, and wherein the weight ratio of the amount of polyphenylene sulfide to the amount of polyphenylsulfone is from about 1:99 to about 99:1.

13. The composition of claim 12, wherein the crosslinked product includes sulfur incorporated into the crosslinks in an amount from about 0.09 wt. % to about 1.1 wt. % based on the weight of the polyphenylene sulfide and the polyphenylsulfone.

14. The composition of claim 1, wherein the mesoporous silicate comprises an ordered surfactant-templated mesoporous silicate, a disordered surfactant-templated mesoporous silicate, a mesoporous layered silicate clay, or a combination comprising at least one of the foregoing.

15. The composition of claim 1, wherein the mesoporous silicate comprises mesoporous silica.

16. The composition of claim 1, wherein the mesoporous silicate is present in an amount of 2 to 30 parts by weight per 100 parts by weight of the polymer component.

17. A method for the manufacture of the composition of claim 1 comprising a crosslinked product of the polyarylene of formula (1) and a mesoporous silicate, the method comprising
mixing the polyarylene of formula (1) with the mesoporous silicate and a crosslinking agent at a temperature and for a time effective to form the composition.

18. The method of claim 17, wherein the crosslinking agent is oxygen, a peroxide, or sulfur.

19. The method of claim 17, wherein the crosslinking is conducted at about 150 to about 400° C. for about 1 to about 200 hours.

20. The method of claim 17, comprising mixing the polyarylene prior to crosslinking.

21. A method for the manufacture of the composition of claim 1 comprising a crosslinked product of a polyphenylene sulfide and a polyphenylsulfone and a mesoporous silicate, the method comprising
heating the polyphenylene sulfide, the polyphenylsulfone, and the mesoporous silicate in presence of a crosslinking agent at a temperature and for a time effective to form the composition.

22. The method of claim 21, wherein heating comprises increasing the temperature to a temperature from about 300° C. to about 375° C. for about 1 to about 200 hours.

23. The method of claim 21, wherein the crosslinking agent is a peroxide, sulfur, metal oxide, sulfur donor agent, or a combination comprising at least one of the foregoing.

24. The method of claim 21, comprising contacting the mesoporous silica with the polyphenylene sulfide and the polyphenylsulfone prior to crosslinking.

25. A downhole article comprising the composition of claim 1.

26. The downhole article of claim 25, wherein the downhole article is a single component.

27. The downhole article of claim 25, wherein the downhole article inhibits flow.

28. The downhole article of claim 27, wherein the downhole tool is selected from the group consisting of seals, compression packing elements, expandable packing elements, O-rings, bonded seals, bullet seals, sub-surface safety valve seals, sub-surface safety valve flapper seal, dynamic seals, V-rings, back up rings, drill bit seals, and electric submersible pump seals.

29. The downhole article of claim 25, wherein the downhole article is pumpable within a downhole environment.

30. The downhole article of claim 29, wherein the downhole article is selected from the group consisting of plugs, bridge plugs, wiper plugs, frac plugs, components of frac plugs, polymeric plugs, disappearing wiper plugs, cementing plugs, swabbing element protectors, buoyant recorders, and pumpable collets.

31. A method of forming a downhole article, the method comprising:
forming a preform of the downhole element comprising (a) a mesoporous silicate and (b) the polyarylene of claim 1 or a combination of the polyphenylene sulfide and the polyphenylsulfone of claim 1; and
heating the preform at a temperature and for a time in presence of a crosslinking agent effective to crosslink the polyarylene or to crosslink the polyphenylene sulfide with the polyphenylsulfone to provide the article.

32. A method of forming a downhole article, the method comprising:
forming particles comprising the composition of claim 1; and
shaping the particles to provide the article.

33. The method of claim 32, wherein forming the particles comprises:
heating a composition comprising (a) a mesoporous silicate and (b) the polyarylene of claim 1 or a combination of the polyphenylene sulfide and the polyphenylsulfone of claim 1 at a temperature and for a time in presence of a crosslinking agent effective to crosslink the polyarylene or to crosslink the polyphenylene sulfide with the polyphenylsulfone to provide a product in bulk; and
comminuting the bulk product to provide the particles.

34. A method of inhibiting flow comprising employing one or more of the downhole article of claim 28.

35. The composition of claim 1, wherein the mesoporous silicate has an average pore size of about 10 nanometers to about 30 nanometers.

36. The composition of claim 1, wherein the mesoporous silicate has an average pore size of about 20 nanometers to about 30 nanometers.

37. The composition of claim 1, wherein the mesoporous silicate is present in an amount of 8 to 15 parts by weight per 100 parts by weight of the polymer component.

* * * * *